June 5, 1962  H. J. MICHAEL  3,037,828
BEARING AND METHOD OF BEARING MANUFACTURE
Filed Aug. 17, 1959
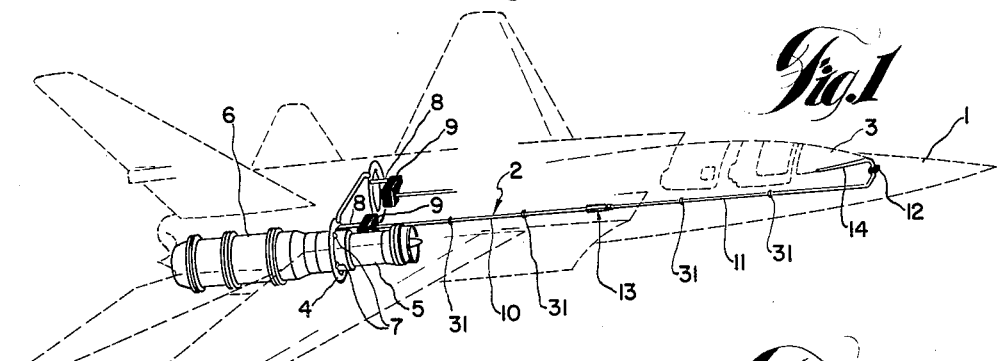
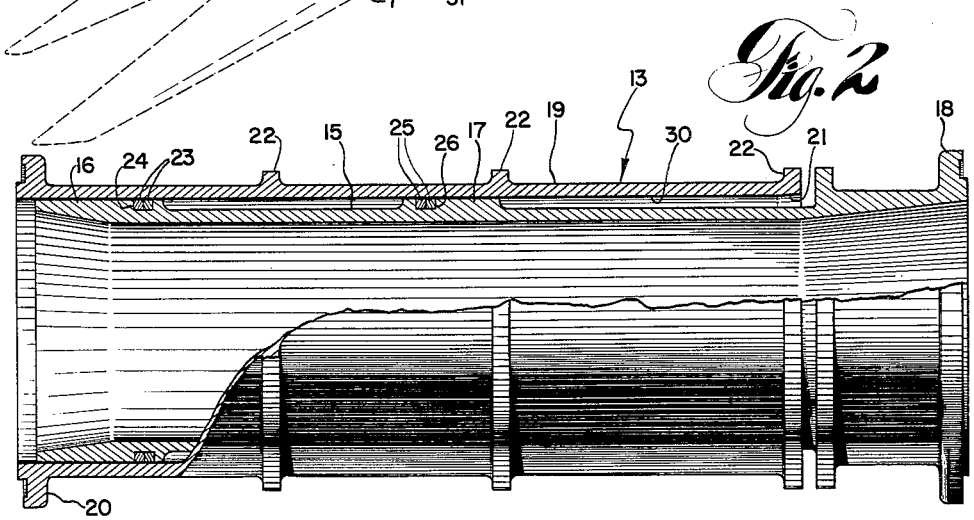
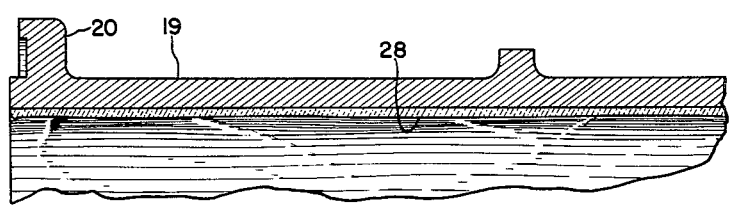
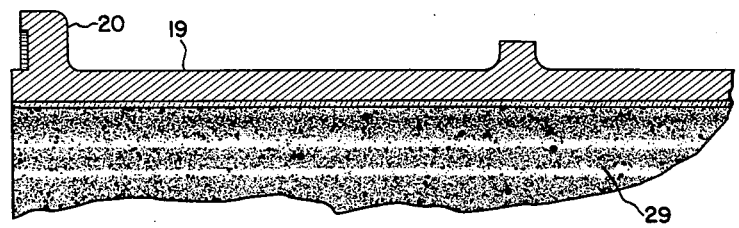
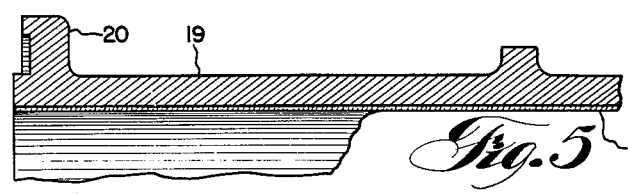
INVENTOR.
HAROLD J. MICHAEL
BY
ATTORNEY United States Patent Office 3,037,828
Patented June 5, 1962

3,037,828
BEARING AND METHOD OF BEARING
MANUFACTURE
Harold J. Michael, % North American Aviation, Inc., 4300 E. 5th Ave., Columbus 16, Ohio
Filed Aug. 17, 1959, Ser. No. 834,076
14 Claims. (Cl. 308—238)

This invention relates to an improved bearing and also concerns a method for providing a bearing with an improved bearing surface. My invention is particularly useful in connection with applications wherein a bearing member will be subjected to high-temperature operating conditions.

The bearing construction of this invention advantageously utilizes a ceramic coating which has been previously machined and afterwards re-fired, which is comprised of a suitable combination of refractory and glass frit materials, and which is properly adhered to a supporting base to thereby provide an improved bearing surface which will withstand comparatively high temperatures.

It is an improtant object of this invention to provide a bearing construction with a bearing surface which offers minimum friction resistance throughout a wide range of high operating temperatures.

Another object of this invention is to provide a bearing construction which functions effectively without lubrication.

Another object of my invention is to provide a bearing construction which incorporates a temperature-resistant, extremely smooth bearing surface having excellent concentricity.

Another object of this invention is to provide a bearing surface which is comparatively shock-resistant.

A still further object of my invention is to provide a bearing coating which has a high-compression strength and hardness at elevated temperatures.

Another object of this invention is to provide a ceramic bearing coating which has excellent machinability.

Another object of this invention is to provide a method of manufacturing a bearing member which obtains the objects set forth above.

A still further object of my invention is to provide a bearing surface which may be economically manufactured and easily applied to a bearing member.

Other objects and advantages of this invention will become apparent during consideration of the detailed description and accompanying drawings.

In the drawings:

FIG. 1 illustrates an airplane having a connector component therein which is manufactured in accordance with this invention;

FIG. 2 is a partially sectioned view of the connector component shown in FIG. 1;

FIGS. 3 and 4 illustrate, in section, a cylinder portion of the connector of FIG. 2 and its bearing surface at intermediate stages of manufacture; and FIG. 5 is a sectional view similar to FIGS. 3 and 4 but illustrating the resulting improved bearing surface of my invention.

Airplane 1 includes an aircraft heating and ventilating system 2 which provides for windshield rain removal and for deicing of windshield surfaces 3. Heating and ventilating system 2 includes the manifold wings 4 which are connected to compressor section 5 of turbojet engine 6 by conduit sections 7. Air bled from section 5 and into the heating and ventilating system typically varies from approximately 350° F. to approximately 950° F. in temperature and from approximately 125 p.s.i. to approximately 300 p.s.i. in operating pressure. Such extracted air is conducted from manifolds 5 through line sections 8 and into the heat exchanger 9 where the temperature of the air is preferably reduced. Line sections 10 and 11 are connected to a heat exchanger 9 and conduct extracted air at a typical temperature of approximately 250° F. to pressure regulator 12 for pressure reduction. In instances where there is heat exchanger failure the temperature of the conducted air often approaches 950° F. A slip joint connector 13, made in accordance with this invention, is located intermediate line sections 10 and 11. Air from pressure regulator 12 is conducted to discharge tube 14 where it is blown over the surface of windshield 3 to effectively remove any liquid or solid moisture which might be present thereon.

Details of slip joint connector 13 are illustrated in FIG. 2. As shown therein, the slip joint connector includes an inner metallic cylinder 15 having integral circumferential lands 16 and 17 located exteriorly thereof. In a typical aircraft heating and ventilating system application cylinder 15 is fabricated of Type 321 stainless steel. Other metals having excellent high-temperature characteristics, however, may be used. An attaching flange 18 is provided at the other end portion of inner cylinder 15. Flange 18 may be of any conventional configuration suitable for attachment to a fluid line.

Connector 13 also includes outer metallic cylinder 19 which is provided at one end with an exterior flange 20 similar to flange means 18. The metal which comprises outer cylinder 19 is preferably the same as the metal which comprises cylinder 15. Such metal must, however, be compatible with the bearing surface coating hereinafter-described to provide for good bearing surface adhesion. The interior dimensions of cylinder 19 are sized to permit free movement with respect to lands 16 and 17 of inner cylinder 15. To facilitate assembly of the components illustrated in FIG. 2, outer cylinder 19 is provided with a slightly-flared taper 21 located at the cylinder end opposite flange means 20. Integral reinforcing flanges 22 are located at spaced intervals along the outer surface of cylinder 19.

Circumferentially split metallic piston rings 23 are seated in a groove 24 provided in land 16. A similar grouping of rings 25 is provided in groove 26 of land 17. Such rings are preferably comprised of stainless steel or the like having commercially available finishes and dimensional tolerances. The outer faces of rings 23 and rings 25 contact the bearing surface at the interior of outer cylinder 19.

Line sections 10 and 11 are supported at various positions along their lengths by a conventional clamp means designated 31. However, clamp members 31 allow sections 10 and 11 linear freedom whereby the sections are permitted to freely expand and contract along their length in response to temperature changes. The bearing construction illustrated in FIG. 2 permits expansion and contraction with a minimum friction resistance and without galling or seizure.

I find that the objects of this invention are obtained if coating 30 is comprised of from approximately 50% to 90% glass frits, and the balance of from approximately 50% to 10% refractory materials. By the term "refractory materials" I mean enameler's clay, zirconia, silica, alumina, titania, magnesia, and the like. Such materials are characterized by a comparatively high-strength at elevated temperatures.

It is preferred that bearing coating 30 be provided at the interior surface of outer cylinder 19 in the following manner. First, the interior surface of component 19 is cleaned conventionally by either a mechanical or chemical treatment. A suitable coating slip is then applied to the interior surface as by sloshing, dipping, or spraying. A specific slip preferred for application to Type 321 stainless steel is comprised of the ingredients proportioned by weight in the following example:

| | Parts |
|---|---|
| Glass Frits | 100 |
| Enameler's clay | 5–7 |
| Zirconia | 8–12 |
| Silica (−325 mesh) | 4–6 |
| Electrolyte | ¼–½ |
| Tap or de-ionized water | 45–55 |

Such slip mixture is milled to a fineness of 6% residue on a 200 mesh screen.

In connection with outer cylinder 19 I prefer to apply sufficient slip to yield an average coating thickness of approximately .012″ after firing. Each applied slip coat should be force-dried at 250° F. ±25° F. for 10 to 15 minutes in an air atmosphere before a subsequent firing operation. During coating applications and during firing operations, cylinder 19 should be positioned with its longitudinal axis oriented vertically to assure maximum concentricity of coating in the end product.

After each slip coating has been provided on the interior surface of cylinder 19, the slip is fired at a temperature of approximately 1520° F. ±10° F. for a period of 6 to 7 minutes to fuse the coating in a proper manner. The initial firing operations produce the intermediate coating 28 shown at an enlarged scale in FIG. 3. As will be noted therein, the resulting fired intermediate coating is not uniformly cylindrical. This is believed to be caused by the uneven flow of the coating slips during application and firing.

I then prefer that coating 28 be machined to a close conventional tolerance to provide the uniformly cylindrical but comparatively rough, intermediate coating designated 29 in FIG. 4. A grinding operation may be utilized and may be accomplished by an aluminum oxide vitrified wheel of medium grit size and medium hardness in connection with a turning operation. Cylinder 19 is chucked in the head of a lathe and rotated at approximately 190 r.p.m. as the grinding wheel (3″ dia.) is rotated at a speed of 9000 r.p.m. relative thereto. A water-soluble, oil-type coolant may be used in connection with the grinding operation. The rate of grindout is relatively low so as to not fracture or burn the previously-fired coating. Resulting intermediate coating 29 should have a finish of less than approximately 140 microinches R.M.S. A typical surface roughness of approximately 60 to 70 microinches R.M.S. is readily obtainable by the procedure set forth above.

Surface 29 is re-fired at 1520° F. ±10° F. for from approximately 6 minutes to approximately 13 minutes in an air atmosphere. The time actually required is generally proportional to the surface roughness obtained by the previous step. A 6 minute re-firing period is generally sufficient for intermediate bearing surfaces ground to approximately 60 microinches R.M.S. The longer period (13 minutes) is generally required when the machined intermediate surface approaches a roughness of 140 microinches R.M.S. The final firing operation provides bearing surface 30 (FIG. 5), which has a typical hardness of 6 or better on Moh's scale, and which has a surface roughness of from 0 to 10 microinches R.M.S. Shrinkage of the coating during the final firing operation is uniform and the dimensional change with respect to the machined diameter of coating 29 is negligible. Also, it is desired that the ingredients provided in coatings 28 through 30 be selected to yield a bearing surface which has a sufficient compression strength and hardness and which has a coefficient of thermal expansion slightly less than the coefficient of thermal expansion for the metal comprising cylinder 19. In this manner compression forces are originated during cooling of the metal part to act upon the coating materials rather than tension forces.

Another example of the composition of a suitable bearing coating is:

| | Percent |
|---|---|
| Glass Frits | 50–67 |
| Enameler's clay | 10–15 |
| Alumina (−325 mesh) | 15–25 |
| Silica (−200 mesh) | 8–10 |

The above ingredients, which are given by percentage of total weight, are combined with a conventional electrolyte and with water to provide a slip having approximately the consistency of the previously-described slip. Application of slip coatings, initial firing, machining, and final firing may be accomplished in accordance with the detailed process steps set forth above. However, the firing temperature is preferably in the range of approximately 1600° F. The end result bearing coating has the advantages set forth above, but has an increased compression strength and operating temperature range.

The specific choice of glass frit and refractory material constituents will depend upon the type of metal to which the coating is to be applied and upon the degrees of surface hardness and roughness that are required in the end product. Generally, the choice of the porcelain enamel material controls final surface roughness and the choice of the refractory materials controls the surface hardness and adaptability to machining or grinding. The composition of the glass frits also affects the surface hardness of the end product because it is believed that in the final firing operation of the ceramic coating a new smooth surface is formed upon the coating by the frit phase of the composition. Apparently, there occurs a "squeezing out" of the glass frit complex silicates to form the smooth, hard skin of the bearing surface. Glass frits high in silica and/or alumina and low in boric oxide and alkali content produces harder surfaces than other frits having a comparatively higher proportion of boric oxide and alkali. The firing schedule for a particular ceramic composition is established upon the choice of frits and refractory materials employed.

Although only one embodiment of a bearing construction is illustrated in the drawings, this invention will find application to other bearing constructions having bearing surfaces which are to be subjected to high temperatures. It is to be understood that the form of the invention herewith shown and described is to be taken as a preferred embodiment of the same, but that various changes in the shape, size, and arrangement of parts may be resorted to without departing from the spirit of the invention or the scope of the subjoined claims.

I claim:

1. A coated metal part with a bearing surface and having, in combination: a base part comprised of metal and provided with a contour surface portion, and a bearing coating adhered to said base part contour surface portion to provide a bearing surface, said bearing coating containing from approximately 50% to 90% of glass frits and the balance of refractory materials, and said bearing coating being machined and re-fired to provide a finely-contoured, glass-like bearing surface which conforms in contour to said base part contour surface.

2. The combination defined in claim 1, wherein said bearing coating contains from approximately 50% to 67% by weight of glass frits and contains from approximately 33% to 50% by weight of refractory materials.

3. A bearing which includes: a first metallic bearing member having a precisely-contoured geometrical surface, a second metallic bearing member carried by said first member and having a precisely-contoured geometrical surface, and a machined, re-fired ceramic coating fused to one of said bearing members to provide a bearing surface, said ceramic coating being in contacting and non-adhering relation to one of said bearing members and having a precisely-contoured geometrical surface which corresponds to the precisely-contoured geometrical surface of the other of said bearing members, and said ceramic coating consisting of approximately 50% to 90% glass frits by weight and of approximately 10% to 50% refractory materials by weight.

4. The bearing construction defined in claim 3, wherein said glass frits comprise from approximately 50% to 67% of the weight of said ceramic coating, and wherein said refractory materials are taken from the materials group consisting of enameler's clay, zirconia, silica, alumina, titania, and magnesia.

5. The bearing construction defined in claim 3, wherein said glass frits comprise from approximately 70% to 80% of said ceramic coating, and wherein said refractory materials comprise the balance of said ceramic coating and are taken from the materials group consisting of enameler's clay, zirconia, silica, alumina, titania, and magnesia.

6. An improved bearing for use in high-temperature environments, and which includes: a first metallic bearing member having a generally cylindrical interior surface portion, a second metallic bearing member positioned within said first member and having a conforming surface portion that is carried by said first member, and a machined, re-fired, ceramic coating fused to one of said surface portions to provide a bearing surface intermediate said surface portions, said ceramic coating corresponding closely in cross-sectional bearing surface contour to the cross-sectional contour of said surface portions and consisting of approximately 50% to 90% of glass frits by weight and the balance essentially of refractory materials combined therewith.

7. The bearing defined in claim 6, wherein said glass frits comprise from approximately 50% to 67% of said ceramic coating by weight, and wherein said refractory materials are selected from the group consisting of enameler's clay, zirconia, silica, alumina, titania, and magnesia.

8. The bearing defined in claim 6, wherein said glass frits comprise from approximately 70% to 80% of said coating by weight, and wherein said refractory materials are enameler's clay, zirconia, and silica.

9. A method of providing an improved bearing surface on a base member, and which includes the steps of: applying a ceramic coating slip on a surface portion of a metallic base member, firing said slip to maturity to provide a comparatively coarsely-contoured and glassy-surfaced intermediate bearing coating in adhering relation to said metallic base member surface portion, machining said intermediate bearing coating to a comparatively finely-contoured and non-glassy-surface condition, and afterwards re-firing said finely-contoured and non-glassy-surfaced intermediate bearing coating to a glassy-surfaced condition to thereby provide said improved bearing surface, said bearing coating being comprised of approximately 50% to 90% by weight of glass frits and the balance essentially refractory materials.

10. The method defined in claim 9, wherein said bearing coating contains approximately from 50% to 67% glass frits by weight, and contains refractory materials selected from the group consisting of enameler's clay, zirconia, silica, alumina, titania, and magnesia.

11. The method defined in claim 9, wherein said bearing coating contains approximately from 70% to 80% glass frits, and contains refractory materials selected from the group consisting of enameler's clay, zirconia, silica, alumina, titania, and magnesia.

12. A method of providing an improved bearing surface on a cylindrical surface of a metallic bearing member, and which includes the steps of: applying a ceramic coating slip to said bearing member cylindrical surface portion, positioning said bearing member cylindrical surface portion with its longitudinal axis oriented vertically and firing said slip to maturity to provide an intermediate bearing surface coating, grinding said intermediate bearing surface coating to a true cylindrical contour, and afterwards positioning said bearing member cylindrical surface portion with its longitudinal axis oriented vertically and re-firing said ground intermediate bearing surface coating to provide said improved bearing surface, said ceramic coating slip containing approximately 50% to 90% by weight of glass frits and the balance essentially refractory materials.

13. The method defined in claim 12, wherein said ceramic coating slip contains approximately 100 parts by weight of glass frits to approximately each 20 to 25 parts of refractory materials contained therein.

14. The method defined in claim 12, wherein said ceramic coating slip is comprised of ingredients which are fired to provide an intermediate bearing coating consisting of 50% to 67% glass frits by weight and the balance of refractory materials selected from the group consisting of enameler's clay, zirconia, silica, alumina, titania, and magnesia.

References Cited in the file of this patent

UNITED STATES PATENTS

| | | |
|---|---|---|
| 1,919,136 | Smith | July 18, 1933 |
| 2,311,039 | Emery | Feb. 16, 1943 |
| 2,480,711 | Calton | Aug. 30, 1949 |
| 2,675,276 | Daugherty | Apr. 13, 1954 |
| 2,757,105 | Terry | July 31, 1956 |
| 2,780,482 | Brown | Feb. 5, 1957 |
| 2,843,500 | Harman et al. | July 15, 1958 |
| 2,901,380 | Crump | Aug. 25, 1959 |

UNITED STATES PATENT OFFICE
CERTIFICATE OF CORRECTION

Patent No. 3,037,828

June 5, 1962

Harold J. Michael

It is hereby certified that error appears in the above numbered patent requiring correction and that the said Letters Patent should read as corrected below.

In the grant, lines 1 to 3, for "Harold J. Michael, of Columbus, Ohio," read -- Harold J. Michael, of Columbus, Ohio, assignor to North American Aviation, Inc. --; line 12, for "Harold J. Michael, his heirs" read -- North American Aviation, Inc., its successors --; in the heading to the printed specification, lines 4 and 5, for "Harold J. Michael, c/o North American Aviation, Inc., 4300 E. 5th Ave., Columbus 16, Ohio" read -- Harold J. Michael, Columbus, Ohio, assignor to North American Aviation, Inc. --.

Signed and sealed this 1st day of January 1963.

(SEAL)
Attest:
ERNEST W. SWIDER
Attesting Officer

DAVID L. LADD
Commissioner of Patents